W. F. FOLMER.
REFLECTING CAMERA.
APPLICATION FILED OCT. 15, 1915.
1,221,304.
Patented Apr. 3, 1917.
3 SHEETS—SHEET 2.
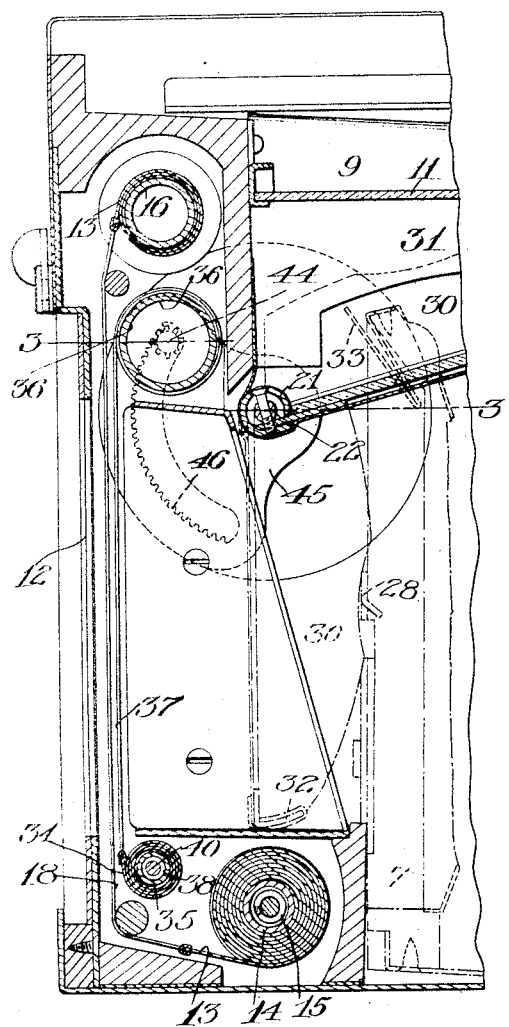
WITNESSES:
INVENTOR.
William F. Folmer
BY
ATTORNEYS.

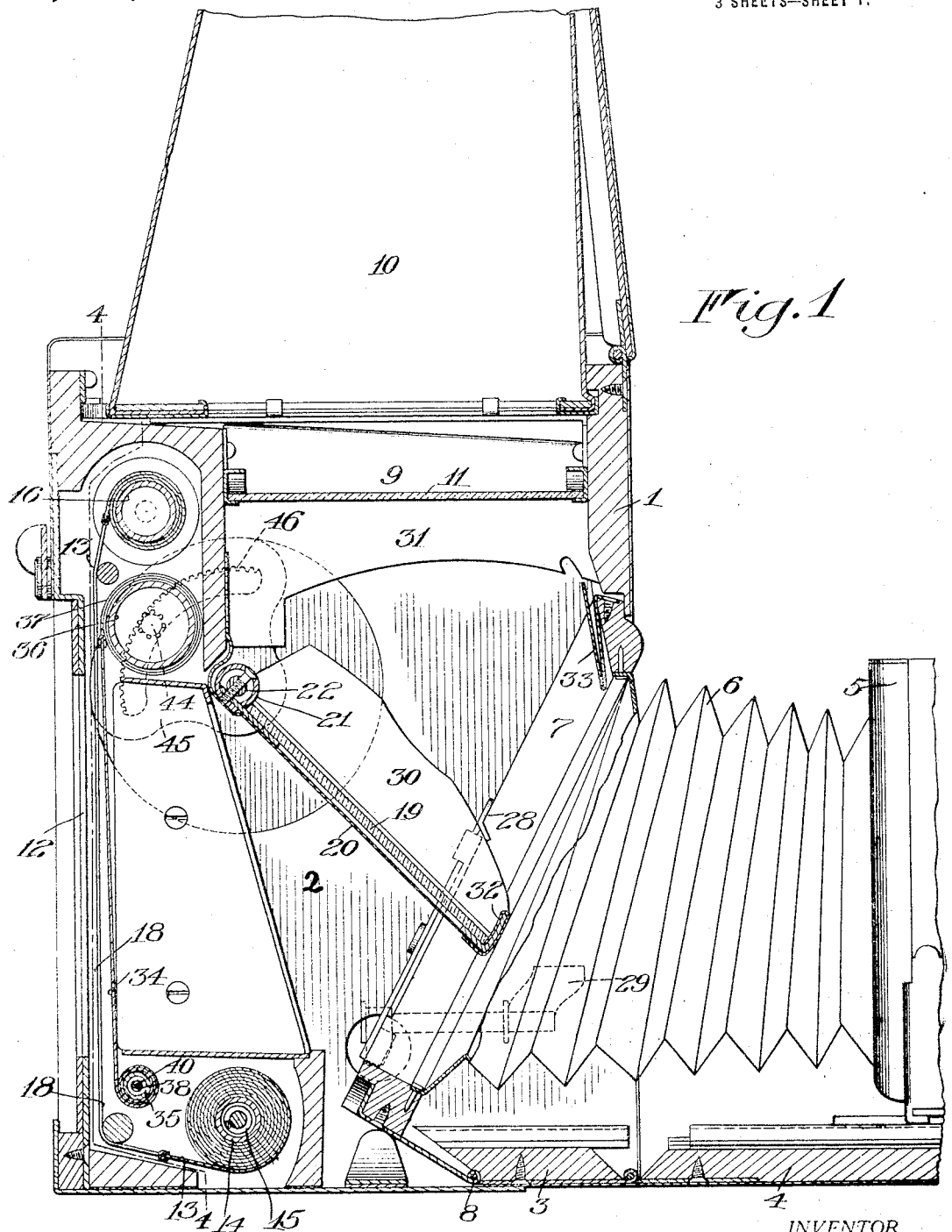

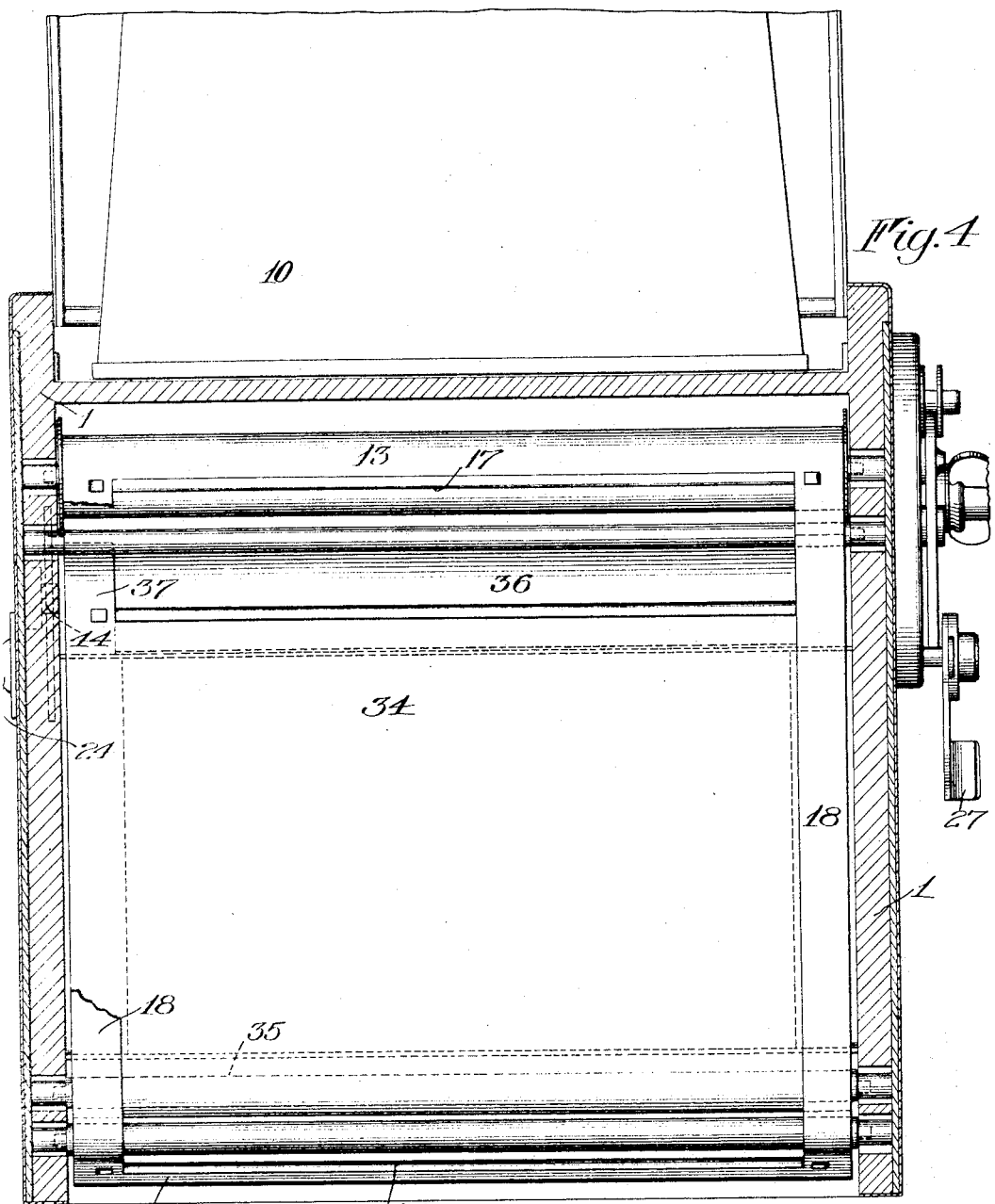

UNITED STATES PATENT OFFICE.

WILLIAM F. FOLMER, OF ROCHESTER, NEW YORK, ASSIGNOR TO EASTMAN KODAK COMPANY, OF ROCHESTER, NEW YORK, A CORPORATION OF NEW YORK.

REFLECTING-CAMERA.

1,221,304.   Specification of Letters Patent.   Patented Apr. 3, 1917.

Application filed October 15, 1915. Serial No. 56,022.

*To all whom it may concern:*

Be it known that I, WILLIAM F. FOLMER, of Rochester, in the county of Monroe and State of New York, have invented certain new and useful Improvements in Reflecting-Cameras; and I do hereby declare the following to be a full, clear, and exact description of the same, reference being had to the accompanying drawings, forming a part of this specification, and to the reference-numerals marked thereon.

My invention relates to photography and more particularly to photographic cameras of the reflecting type in which there is a focusing screen at one side of the axis of the lens and a mirror within the camera for reflecting the image cast by the camera lens onto the screen. Such cameras are usually fitted with curtain or focal plane shutters and while the shutter is being reset, the mirror is usually relied upon to prevent the cone of light from reaching the focal plane and the sensitive material located therein. This invention has for its object to provide a safety blind in front of the focal plane which will be automatically brought into position to protect the sensitive material when the shutter is being reset or when the mirror is in a position permitting the entrance of light to the camera and, generally, to obviate the necessity of fitting the mirror in a light tight manner and of relying upon it to screen the sensitive material when the mirror is in operative position for focusing. To these and other ends the invention resides in certain improvements and combinations of parts all as will be hereinafter more fully described, the novel features being pointed out in the claims at the end of the specification.

In the drawings:

Figure 1 is a central vertical section through a reflecting camera provided with a mirror and safety blind constructed in accordance with and illustrating one embodiment of my invention, the mirror being shown in operative position for focusing;

Fig. 2 is a similar but fragmentary view showing the safety blind in another position and the mirror in inoperative position;

Fig. 3 is a transverse section taken substantially on the line 3—3 of Fig. 2;

Fig. 4 is a transverse section taken approximately in the focal plane of the camera on the line 4—4 of Fig. 1, and Fig. 5 is a detail section partly broken away through the tension roll of the safety blind.

Similar reference numerals throughout the several figures indicate the same parts.

Referring first to the general features of camera construction as best shown in Fig. 1, 1 indicates the camera body (the detachable back of which is shown removed), 2 the exposure chamber; 3 the bed; 4 the extension bed; 5 the adjustable front; 6 the bellows, and 7 the tilting bellows frame pivoted at 8 and which, when tilted back to an erect position, makes room within the body for housing the front 5. At the top of the exposure chamber 2 there is a focusing opening 9 surrounded by a focusing hood 10 and fitted with a ground glass or other focusing screen 11. The focal plane of the camera in which the film or other sensitive medium is disposed is just in rear of the exposure opening indicated at 12 and a curtain shutter 13 operates in a plane in advance of the focal plane between a tension roller 14 having an actuating spring 15 and a winding roller 16. All of the foregoing features may be of the usual or any preferred construction. In Fig. 4, the full opening or time aperture of the curtain shutter is shown at 17 and the side tapes (one of which is broken away) at 18.

In the practice of my invention, the focusing mirror 19 is carried in a frame 20 fixed to a shaft 21 arranged at the rear and top of the exposure chamber 2. A relatively fixed inner shaft 22 is journaled in bushings 23 and 24 in the camera walls and around this shaft is coiled a spring 25 within the tubular shaft 21 having one end fixed to the shafts and the other end fixed to the bushing 24 for rotating the shaft and mirror to the left in the figures. The bushing 24 may be rotated in the casing wall and secured by a screw 26 to change the tension of the spring 25. The shaft and mirror may be rotated against the tension of the spring by an exteriorly arranged operating lever 27 on shaft 22.

The normal position of the mirror 19 is that of Fig. 1 being at a 45° angle to the axis of the camera lens so that the image cast thereby is reflected upwardly onto the focusing screen 11. The mirror is held in this position against the tension of its spring by a latch 28 on the bellows frame 7 through which latter the mirror projects in its operative position. The latch may be released by a suitably arranged and connected trip 29 (shown in dotted lines in Fig. 1) accessible from the exterior of the camera. When the latch is released and the mirror frame flies upwardly under the influence of its spring 25 it closes the focusing aperture and seals the exposure chamber from the entrance of light from that quarter. For this purpose, lateral flanges 30 on the frame coöperate with similar flanges 31 extending downwardly at the sides of the opening and a front flange 32 on the mirror frame, preferably covered with plush or similar material, coöperates with a yielding plate 33 at the top of the bellows frame 7. This position is indicated in Fig. 2 by full lines while the dotted position of the mirror frame in this figure is that which it assumes when the camera is folded and the bellows frame 7 is thrust back to an erect position, as also shown in Fig. 2. The mirror is reset by means of the lever 27, as previously described, and the latch 28 engages automatically with one of the flanges 30 to define the operative position.

Cameras of this kind are usually fitted with a connection between the mirror and the curtain shutter whereby the latter is tripped as the mirror reaches its inoperative or light sealing position and there is also a connection whereby the curtain shutter may not be rewound and its apertures caused to traverse the sensitive element until the mirror is brought into operative position. These features are well known and require no description here. The last mentioned provision is made because the operative position of the mirror has been relied upon to intercept the cone of light from the lens during rewinding. It was heretofore necessary to provide a light tight seat for the mirror in its inclined or operative position, also, and great difficulty has been experienced in making this seat effective without being too complicated.

It will be seen that the mirror of the present invention does not come against the seat and no attempt is made to use it as a seal for the light from the lens, although I prefer to utilize the above mentioned feature of locking the shutter against rewinding except when the mirror is in operative position. I protect the sensitive material at this time in another manner which is as follows:

In rear of the mirror 19 but forwardly of the focal plane and of the curtain shutter 13, I arrange a roller blind or safety curtain 34 that runs between a tension roller 35 adjacent to the roll 14 and a winding roll 36 arranged adjacent to the winding roll 16 of the curtain shutter. This safety curtain or blind is shown closed in Fig. 1 and open in Fig. 2, 37 being the side tapes which permit it to be entirely opened by being taken up on the tension roll 35. The latter contains a spring 38 best shown in Fig. 5 one end of which is connected thereto at 39 while the other end is fixed to a relatively rotatable core 40 at 41. The core is detachably connected to a disk 42 on the exterior of the camera that may be rotated and secured in different positions by a screw 43 to change the tension.

When this roll blind or safety curtain 34 is drawn as shown in Fig. 1, the sensitized material in the focal plane is prevented from being fogged by light entering either through the focusing aperture or through the camera lens and the curtain shutter in rear of it may be reset. I therefore so connect it with the mirror 19 that it is closed or drawn when the mirror is in operative position for focusing and is automatically opened or retracted when the mirror goes to its inoperative position in which it seals the focusing aperture. As such movement of the mirror also trips the shutter in making all but time exposures, the safety blind is therefore out of the way in time for the exposures. Similarly, the release of the winding mechanism of the curtain shutter for rewinding always finds the safety curtain closed. In other words, the safety curtain prevents access of the light admitted through the focusing aperture to the sensitized material.

Preferably, this connection comprises a gear 44 on the winding roll 36 and a segment 45 on the mirror shaft 21 fixed thereto and having teeth 46 meshing with the gear 44, as clearly shown in the drawings. As the mirror is rocked in one direction by means of the lever 27, and in the other, by means of its spring 25, the safety curtain moves correspondingly with or against the tension of its own spring 38, as the case may be. The springs 25 and 38 work with each other and each affects not only the part with which it is directly connected, but also has an influence on the other part.

I claim as my invention:

1. In a reflecting camera, the combination with a body having a focusing aperture and a movable focusing mirror having an operative position in the path of the light cone from the camera lens and an inoperative position in which it seals the focusing aperture, of a safety blind adapted to prevent the cone of light from reaching the focal plane of the camera, and connections between the mirror and blind for maintaining the latter closed when the mirror is moved away from the focusing aperture and for maintaining it open when the mirror is acting as a light seal for said aperture.

2. In a reflecting camera, the combination with a body having a focusing aperture and a movable focusing mirror having an operative position in the path of the light cone from the camera lens and an inoperative position in which it seals the focusing aperture, of a safety curtain in rear of the mirror and in front of the focal plane of the camera, rolls therefor, and connections between one of the rollers and the focusing mirror for maintaining the curtain closed when the focusing aperture is open and vice versa.

3. In a reflecting camera, the combination with a body having a focusing aperture and a pivoted focusing mirror having an operative position in the path of the light cone from the camera lens and an inoperative position in which it seals the focusing aperture, of a safety curtain in rear of the mirror and in front of the focal plane of the camera, wind up and tension rolls therefor, a gear on the wind up roll, a shaft for the focusing mirror, and a segment on said shaft meshing with the gear on the wind up roll to close the safety curtain when the mirror is swung to operative position and to open it when the mirror is moved to inoperative position.

WILLIAM F. FOLMER.

Witnesses:
RUSSELL B. GRIFFITH,
HARRIET J. VAY.